June 24, 1969
M. B. PARMETT
3,452,285
SWEEP AND TIMING PULSE GENERATOR FOR RADAR SIMULATION
Filed Aug. 6, 1965
Sheet 1 of 2
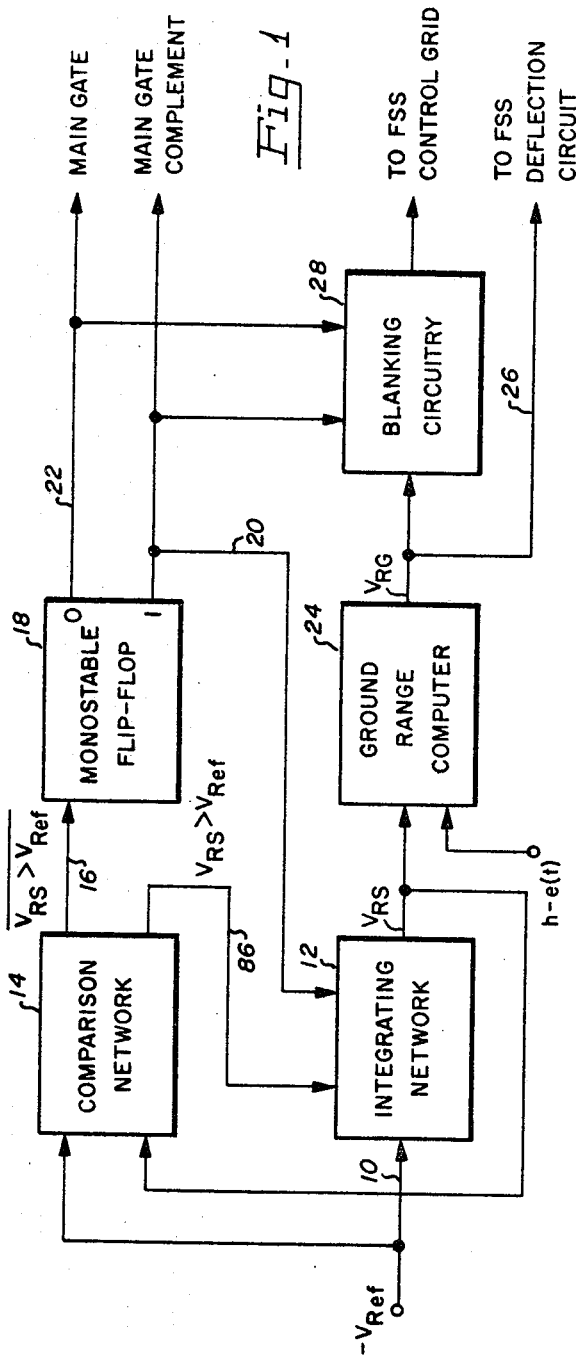
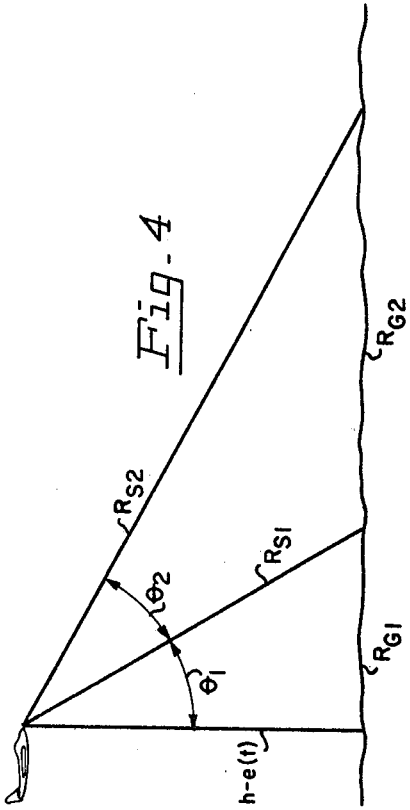
INVENTOR.
MICHAEL B. PARMETT
BY
*Edward A. Robinson*
ATTORNEY

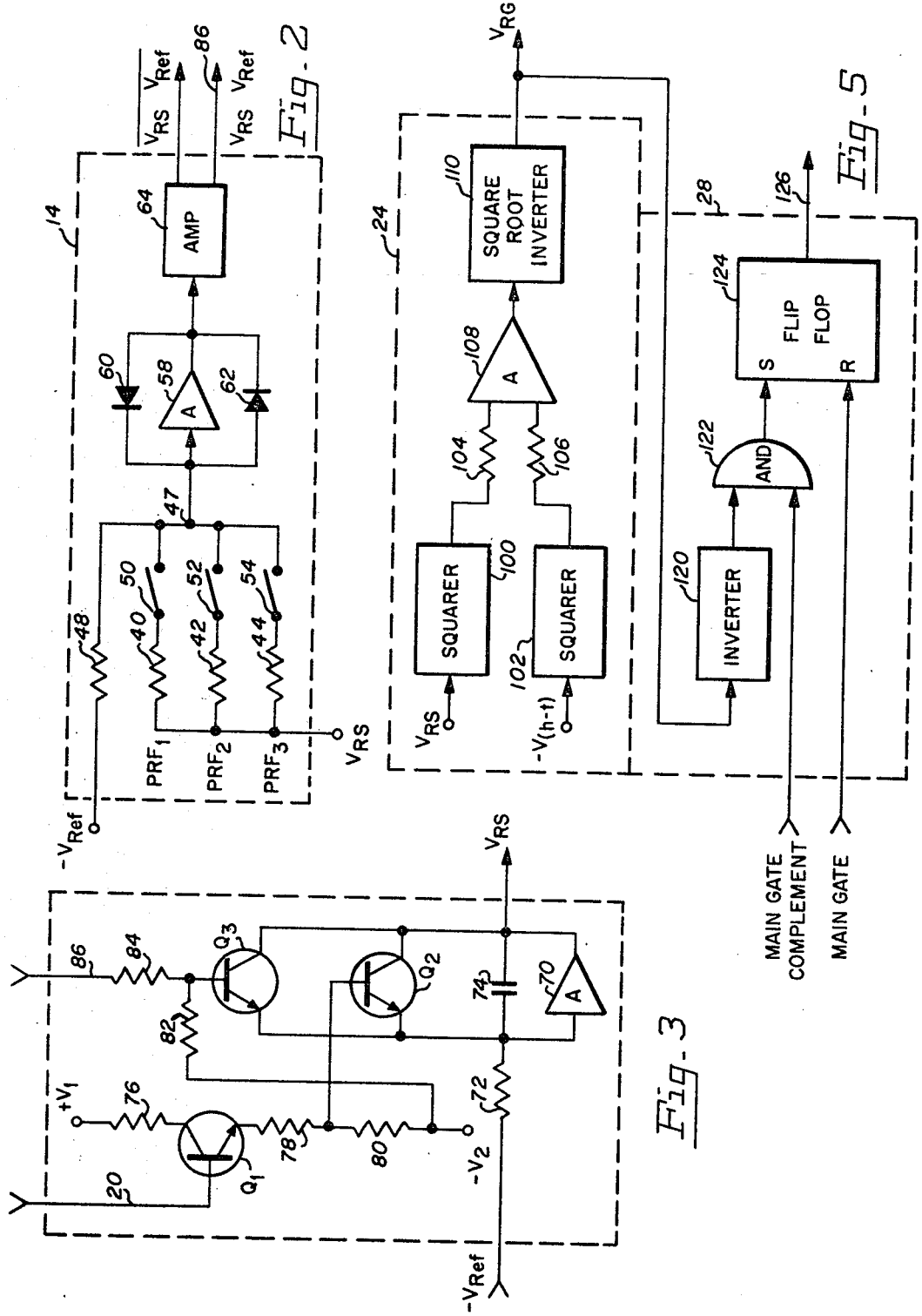

United States Patent Office 3,452,285
Patented June 24, 1969

3,452,285
SWEEP AND TIMING PULSE GENERATOR FOR RADAR SIMULATION
Michael B. Parmett, Menlo Park, Calif., assignor to Singer-General Precision, Inc., a corporation of Delaware
Filed Aug. 6, 1965, Ser. No. 477,787
Int. Cl. H03k *3/78;* G01s *9/00*
U.S. Cl. 328—181                                      3 Claims

ABSTRACT OF THE DISCLOSURE

An integrating circuit generates a ramp function signal which is compared with a reference potential to provide timing pulses. The timing pulses (1) reset the integrating circuit and (2) are passed to further circuitry to provide blanking signals and other timing functions for radar simulation.

---

This invention relates to a sweep generator and more particularly to an improved sweep generator operable to provide the necessary sweep waveforms and timing and blanking pulses for use with a visual display system.

For a number of years, aircraft and other vehicle simulators have been designed and constructed which, in general, include a grounded realistic reproduction of the control areas of the vehicle being simulated, together with the necessary controls and indicating devices. Associated with the control area is one or more analog and/or digital computers adapted to accept electrical inputs in accordance with the settings of various ones of the controls as adjusted by a student operator-trainee, and to rapidly derive therefrom further electrical signals representative of the necessary inputs for the indicating and other devices. In this manner, the student operator may be competently trained in the proper operation and control of the vehicle under various conditions without however, incurring the inherent dangers and risks resulting from the operation and control of the actual vehicle.

More recently, particularly with respect to aircraft simulators, such training apparatuses include simulation of one or more equipments normally installed in such vehicles which may include, for example, an auxiliary device such as a radar system. Basically, aircraft radar systems normally comprise a transmitter of electromagnetic energy pulsed at a predetermined rate and a receiver which responds to the reflected portion of the transmitted energy incident upon an object or terrain. The output of the radar receiver is then coupled to a cathode-ray-tube (CRT) which, in accordance with a preselected electron beam scanning pattern, presents a map-like representation of the objects intercepted by the transmitted energy.

The simulation of an actual radar system may be readily accomplished by employing at least one flying-spot-scanner (FSS) or other light source to synchronously scan at least one photographic film transparency, wherein the gray scale variations upon a first transparency may correspond to radar reflectance information and a second transparency is encoded with terrain elevation information. The modulated light passing through the transparencies is logically operated upon and combined to provide input signals for a CRT display device or console. An example of such simulated radar systems is described and claimed in U.S. Patent No. 3,100,238.

Although the above briefly described system operates efficiently when only a single radar system is to be simulated, it has proved to be unduly complicated when a number of radar systems are to be included in the grounded aircraft trainer. This results from the fact that the master timing pulse for the "main bang" and other timing circuits has normally been generated by a flip-flop or other type of relaxation oscillator, each or the timing pulses being thereafter integrated to provide the necessary sweep waveforms for the FSS and CRT. Since present day high-performance military aircraft may employ five or more different types of radar systems, each having an individual pulse repetition rate (PRF) and range display, the problem of providing the PRF and the range display associated therewith requires the use of both a number of oscillators, and a number of integrators together with the necessary switching circuitry.

According to the present invention however, there is provided an improved sweep and timing pulse generator wherein the sweep waveform voltage is used to generate the timing pulses, and the circuit itself automatically modifies the range display in accordance with the PRF selected. Additionally, since a linear sweep waveform corresponds essentially to the actual ground range from a student at a particular simulated altitude to the ground which heretofore has generally been employed for the CRT display, a more accurate map-like representation of the objects intercepted by the transmitted radar beam occurs when a non-linear sweep waveform proportional to slant range is coupled to the CRT, such a non-linear sweep waveform also being readily provided by the circuitry of the present invention. Further, as a result of the inherent time lag between each transmitted pulse and the first echo return, a blanking circuit prevents the display of terrain during this time interval, the time interval being proportional to the simulated altitude, all as more particularly hereinafter described.

It is an object of the invention therefore, to provide a sweep generator.

Another object of the invention is to provide an improved sweep generator operable to provide the necessary sweep waveforms and timing and blanking pulses for use with a visual display system.

A further object of the invention is to provide a sweep and timing pulse generator for use with a simulated radar system.

Yet another object of the invention is to provide a sweep and timing pulse generator wherein the timing pulses are derived from the sweep waveform rather than conversely.

Still another object of the invention is to provide a sweep and timing pulse generator circuit wherein the circuit operates to automatically modify the simulated radar range display in accordance with a selected PRF.

Another object of the invention is to provide a single sweep generator adapted for use with a number of simulated radar systems.

A still further object of the invention is to provide a simulated terrain mapping radar system sweep and timing pulse generator including blanking circuitry for preventing the display of terrain data during the time interval between each simulated transmitted radar pulse and the first one to return.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a block diagram of one embodiment of the invention.

FIG. 2 is a schematic diagram of a comparison network useful in the embodiment of the invention illustrated in FIG. 1.

FIG. 3 is a schematic diagram of an integrating network which may be used in the embodiment of the invention shown in FIG. 1.

FIG. 4 is a simplified geometrical representation of the relationship between an aircraft radar system and the terrain being scanned.

FIG. 5 is a schematic diagram of the ground range computer and the blanking circuitry illustrated in FIG. 1.

Although the sweep generator of the invention has general utility in the electronic arts, it will first be described in a radar simulator which may be employed in a grounded aircraft flight trainer, other and different uses being in part obvious and in part hereinafter briefly described.

In general, radar simulators may include one or more photographic film transparencies encoded with terrain elevation and radar reflectance data. This data is viewed by deflected light beams which are generated by a flying-spot-scanner (FSS) and optically directed through the transparencies, the intensity of the ligth beams being modulated by the data encoded in gray scale variations on the films. The modulated light beams are converted to electrical signals by photomultipliers or similar devices, modified by various computers, to provide a radar video signal which is applied to the intensity control grid of a cathode-ray-tube. Further details of radar simulators of this or other types are to be found in the above-referenced patent.

Referring now to the drawings, FIG. 1 illustrates in block diagram form a first embodiment of the sweep and timing pulse generator of the invention which may be used with a FSS in a radar simulator. As there-shown a reference voltage, $-V_{REF}$ is fed along a line 10 to a first input terminal of an integrating network 12. Initially, the output voltage, $V_{RS}$, generated by network 12 is reset to a predetermined potential, thereafter linearly increasing in response to the applied voltage, $V_{REF}$, as may be understood by those skilled in the art. The output potential generated by network 12 is applied to one input terminal of a comparison network 14, a second input terminal of network 14 being coupled to reference voltage $-V_{REF}$. As hereinafter more particularly described, comparison network 14 provides a negative signal, along a line 16 whenever $V_{RS}$ exceeds the amplitude level of reference voltage $-V_{REF}$, which is sufficient to trigger, that is change the state of, a monostable flip-flop 18. The output of flip-flop 18 is coupled to a second input of integrating network 12 along line 20 and operates to reset the linearly increasing function $V_{RS}$ to the predetermined potential hereinabove referred to. Next, when flip-flop 18 returns to its stable state, $V_{RS}$ again linearly increases. In this manner, a recurrent linear sweep waveform is provided.

It may now be seen that the above briefly described sweep circuitry as shown in the block diagram of FIG. 1 operates as a closed-loop sweep generator, wherein the linear sweep waveform, as modified by comparison network 14, operates to determine the sweep repetition rate, since when the comparator provides a signal equal to the complement of the function ($V_{RS}$ greater than $V_{REF}$), integrator 12 is reset by the output signal from the flip-flop. The waveform on line 20 functions as the complement of the simulated radar main gate waveform and may be negative during sweep generation and positive during reset time, for example, the main gate waveform being available on line 22.

The sweep waveform is also fed to an input of ground range computer 24. As will be better understood as the description proceeds, the linear sweep is equivalent to the slant range of the simulated aircraft. However, a more realistic display is obtained by deflecting the light beam of the FSS as a function of the aircraft ground range. The ground range computer accepts linear slant range sweep signal $V_{RS}$ as well as an analog voltage, $h-e(t)$, proportional to the height of the aircraft above the terrain, and computes a signal, $V_{RG}$, equivalent to ground range which is coupled to the FSS deflection circuitry along line 26. Further, $V_{RG}$, together with the main gate and main gate complement voltages are applied to blanking circuitry 28 to generate a positive signal during sweep time and a blanking signal during sweep reset time, that is, retrace time.

FIG. 2 illustrates a comparison network which may be employed in the block diagram of FIG. 1. As there-shown, the slant range sweep waveform is applied to one terminal of each of several scaling resistors indicated as 40, 42, and 44, and reference potential $-V_{REF}$ is applied to a summing junction 47 through a further scaling resistor 48. One of scaling resistors 40, 42, and 44 is selected by switches 50, 52, and 54 and is coupled to summing junction 47. By selecting different value of resistances for resistors 42, 44, and 46, different sweep rates are obtained. This results from the fact the magnitude of current flow through the selected resistor varies inversely with the resistance value upon the application of $V_{RS}$ thereto, that is the scaled value of $V_{RS}$ exceeds the scaled value of $-V_{REF}$ as a function of the value of the selected resistance. A further feature provided by the scaling resistors is automatic sweep amplitude modification commensurate with the value of sweep rate selected.

In a radar simulator for simulating one of a number of different radars which may be a navigation radar, a terrain avoidance radar, or any of the well known other types, it is generally necessary to change the pulse repetition frequency, PRF and range for each of the radars being simulated. Since the PRF is determined by the timing of the main gate which is controlled by the sweep rate which triggers flip-flop 18, it may be seen that the scaling resistor network within comparison network 14 may provide a first PRF, labeled $PRF_1$ in FIG. 2 upon closure of switch 50, and second and third PRF's upon closure of switches 52, and 54, respectively, the number of PRF's available being determined by the number of $V_{RS}$ scaling resistors employed. The PRF selection switches may be operated by the radar selector switch, by relays, or by any conventional means. Further, the higher the pulse repetition frequency the smaller is the range displayed on the radar display device because of the decreased time between each of the radar "main bangs." As stated, the scaling resistor network automatically performs this feature. Note that as the resistance of the $V_{RS}$ scaling resistance is lowered, comparison is attained earlier in time, resulting in decreased amplitude of sweep waveform $V_{RS}$ which increases linearly with time, exactly as required.

The signal summed at junction 47 is coupled to feedback summing amplifier 58. In order that the closed loop system now being described exhibit as high a gain as possible so that the time at which $V_{RS}$ becomes greater than $-V_{REF}$ may be accurately determined when $V_{RS}$ is essentially equal to $-V_{REF}$, while preventing system overload when $V_{RS}$ is a relatively small voltage at the beginning of each sweep, a pair of oppositely poled diodes 60 and 62 provide the feedback between the output and input terminals of amplifier 58. Thus, the amplifier provides a high gain to small input signals and a low gain or even attenuation to large signals, as a result of the decrease in impedance presented by one or the other of the feedback diodes; in a typical example the output swing may be limited essentially to ±1 volt.

The output of amplifier 58 is then coupled to a double-ended amplifier 64 which provides the complementary signals shown in FIG. 1. It may be seen therefore, that comparison network 14, which forms one unit of the closed loop sweep generator of the invention, differs markedly from the sweep generators of the prior art. Generally, individual sweep rate determining oscillators have been selected from which main gate timing pulses are generated, the pulses thereafter being integrated to provide the necessary sweep waveform. Such systems are unduly complicated and subject to frequency instability. In the circuitry above described however, an accurate linear sweep waveform is first generated and then it is employed to trigger a flip-flop by comparing the amplitude of the waveform with a reference voltage to provide main gate waveforms which may be differentiated to provide the trigger pulses.

An integrating network which may be used to generate linear slant range sweep waveform $V_{RS}$ is illustrated in FIG. 3.

As there shown, $-V_{REF}$ is applied to the input of a wide-band operational amplifier 70 through scaling resistor 72. Connected in parallel with amplifier 70 is feedback capacitor 74, the combination of amplifier 70 and capacitor 74 acting as a conventional integrator to provide the positively going waveform $V_{RS}$. The collector of a transistor $Q_1$ is connected through a resistor 76 to voltage source $+V_1$, the emitter of transistor $Q_1$ being connected through serially connected resistors 78 and 80 to a second voltage source $-V_2$, and the base of $Q_1$ is directly connected to the main gate complement voltage. The emitter and collector of another transistor $Q_2$ are connected in parallel with the terminals of capacitor 74, the base of transistor $Q_2$ being connected to the junction of resistors 78 and 80.

Remembering now that the main gate complement is negative until monostable flip-flop 18 is triggered, it may be seen that resistor $Q_1$ is rendered non-conducting, thereby preventing current flow through resistors 78 and 80 and applying $-V_2$ to the base of transistor $Q_2$ which is of sufficient magnitude to maintain $Q_2$ also non-conducting. Thus during the generation of sweep voltage $V_{RS}$, transistors $Q_1$ and $Q_2$ have no effect on the operation of integrator network 12. However when $V_{RS}$ becomes greater than $-V_{REF}$ and changes state, the main gate complement voltage becomes positive switching transistor $Q_1$ to the conductive state. Current flow through the series circuit consisting of resistors 76, 78, 80 and transistor $Q_1$ causes a positive going voltage drop across resistor 80, raising the voltage level applied to the base of transistor $Q_2$ to turn it on. Transistor $Q_2$ connected across capacitor 74 is now a low impedance and discharges the capacitor, returning $V_{RS}$ to the predetermined potential and terminating the generation of the linear sweep. Upon the return of the flip-flop to the stable state, the main gate complement voltage once again becomes negative, cutting off transistor $Q_1$ which in turn causes transistor $Q_2$ to become negative.

During initial turn-on, because of transient or other effects it is possible that $V_{RS}$ may become much greater than $-V_{REF}$. Under these conditions, if the flip-flop is A.C. coupled to the comparison network it will not be triggered, transistor $Q_1$ will not be turned on, and no sweep waveform will be generated. For this reason a further transistor $Q_3$ is added having its emitter and collector connected to the emitter and collector of transistor $Q_2$; that is in parallel with capacitor 74. The base of transistor $Q_3$ is coupled through resistor 82 to voltage source $-V_2$ as well as through resistor 84 to the $V_{RS}$ greater than $-V_{REF}$ output lead 86 of comparison network 14. By proper choice of resistors transistor $Q_3$ is turned on only when $V_{RS}$ is much greater than $-V_{REF}$, discharging capacitor 74 and returning the circuit to normal operation.

In a radar simulator, the data stored on the photographic film transparencies is linear with ground range, while the aircraft radar views the terrain along a slant range. In order to realistically present the ground targets on the radar display, the linear sweep waveform $V_{RS}$ must be modified prior to being applied to the FSS deflection circuitry. This may best be understood with reference now to FIG. 4 which illustrates in simplified form the geometrical relationships between the aircraft radar and the ground and slant ranges. As thereshown, the radar is located at an altitude of $h-e(t)$, where $h$ is the height above seat level and $e(t)$ is the terrain elevation immediately beneath the radar. When the radar views the ground along slant range $R_{S1}$, angularly displaced from the vertical by the angle $\theta_1$ ground range $R_{G1}$ is intercepted. Viewing the ground along slant range $R_{S2}$, angularly displaced from $R_{S1}$ by the angle $\theta_2$, where $\theta_2$ is equal to $\theta_1$, the ground range is increased. It may be seen that $R_{G2}$ is much greater than $R_{G1}$, and to properly scan the film, the deflection sweep voltage must increase essentially hyperbolically, and may be defined as:

$$R_G = \sqrt{R_S^2 - (h-e(t))^2}$$

This function may readily be generated by the circuitry shown in FIG. 5. A pair of analog voltages, the first commensurate with the linear slant range, $V_{RS}$, and the second commensurate with the radar altitude provided by the radar simulator, $-v(h-t)$ are individually applied to squarers 100 and 102, respectively. The squarer output voltages are applied through scaling resistors 104 and 106 to a summing amplifier 108, the output of which corresponds to the function $[V(h-e(t))^2 - V_{RS}^2]$. This function is next delivered to square root inverter circuit 110 to provide a non-linear ground range sweep voltage $V_{RG}$. Since the circuits within blocks 100, 102, 110 may be standard analog servo systems, or vacuum tube circuits as described beginning at page 678 in the volume entitled Waveforms published in 1949 by McGraw-Hill Book Company, Inc. and the transistor equivalents thereof no further description of the blocks is included herein.

As also shown in FIG. 5, the voltage $V_{RG}$ is applied through an inverter 120 to a first input of AND circuit 122 and the main gate complement is applied to a second input of the AND circuit. During sweep time the output of inverter 120 and the main gate complement voltage are each negative, opening AND gate 122 providing an output which is applied to the set input of a flip-flop 124. The setting of this flip-flop provides a positive voltage along line 126 and maintains the FSS unblanked during the entire swee time. During retrace time however, the main gate complement goes negative closing AND circuit 122. Simultaneously, the main gate voltage, coupled to the reset terminal of flip-flop 124, become negative and resets the flip-flop 124 which then provides a zero or negative voltage on line 126.

What has been described is a novel linear sweep generator wherein the sweep waveform is employed to generate the trigger timing waveforms, and where accurate sweep rates are provided by the selection of one of a group of precision resistors. It is also contemplated by the invention to employ a potentiometer in lieu of the resistors, should a continuously variable sweep rate be desired. Additionally a marked increase in stability is attained since a high-gain, closed-loop system is employed in which the linear sweep waveform is used to generate the trigger waveform, and the trigger waveform stops and restarts the sweep waveform. Further, although the invention may be substituted for any of the ramp generators it is readily adaptable for use in aircraft radar simulators, all as above described.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

The embodiments of the invention in which an exclusive property or privilege is claimed are defined as follows:

1. A sweep and timing pulse generator comprising, resettable means for generating a linear periodic ramp function;

a comparison network coupled to said ramp function and to a reference potential for providing an output signal which changes from a first polarity to a second polarity when the amplitude of said ramp function exceeds said reference potential; said comparison network including
- a summing amplifier,
- a first scaling resistor connected between said reference potential and the input of said summing amplifier; and
- a plurality of selectable second scaling resistors connected between said ramp function and the input of said summing amplifier, the ratio between the selected one of said plurality of second scaling resistors and said first scaling resistor determining both the period and amplitude of said ramp function;

a monostable switching device responsive to the output signal of second polarity for providing a resetting signal; and means coupling said resetting signal to said resettable means, said resetting signal being additionally available as a timing pulse synchronized by said periodic ramp function.

2. The generator as defined in claim 1 wherein said summing amplifier includes,
- variable impedance feedback means coupled between the output and input thereof;
- said variable impedance feedback means consisting essentially of a pair of reverse poled diodes which limit the output signal amplitude of said summing amplifier when said output amplitude tends to exceed a predetermined amplitude of either polarity while allowing said summing amplifier to exhibit maximum gain when said output signal tends to change polarity.

3. A linear sweep generator comprising in combination,
integrating means coupled to a reference potential for providing a first output potential which increases linearly with time above a predetermined potential;

comparison means coupled to said reference potential and said first output potential for providing a second output potential having a particular one of two polarities only when said first output potential is greater than said reference potential, said comparison means including
- a summing junction,
- first circuit means coupling said reference potential to said summing junction through a first scaling resistor, and
- second circuit means coupling said first potential to said summing junction through a selected one of a plurality of second scaling resistors, the value of resistance of said selected one of a plurality of second scaling resistors determining the time interval during which said first output potential increases linearly with time; and means responsive to said second output potential having said particular one of two polarities for a momentarily resetting said first output potential to said predetermined potential.

References Cited
UNITED STATES PATENTS

| | | | |
|---|---|---|---|
| 3,303,359 | 2/1967 | Brisay | 307—88.5 |
| 3,323,353 | 6/1967 | Munger | 328—185 XR |

ARTHUR GAUSS, *Primary Examiner.*

STANLEY D. MILLER, *Assistant Examiner.*

U.S. Cl. X.R.

35—10.4; 307—228, 229, 235, 263, 264, 269, 271; 328—146, 185